US009200652B1

(12) United States Patent
Laurence (10) Patent No.: US 9,200,652 B1
(45) Date of Patent: Dec. 1, 2015

(54) FASTENING SYSTEMS AND METHODS FOR FIXING FLEXIBLE MATERIAL

(71) Applicant: KBL Holdings Pty Ltd, Belmont WA (AU)

(72) Inventor: Peter Laurence, Belmont (AU)

(73) Assignee: KBL HOLDINGS PTY LTD (AU)

( * ) Notice: Subject to any disclaimer, the term of this patent is extended or adjusted under 35 U.S.C. 154(b) by 0 days.

(21) Appl. No.: 14/324,115

(22) Filed: Jul. 4, 2014

(51) Int. Cl.
  *E04B 1/00* (2006.01)
  *F16B 2/22* (2006.01)
  *F16B 5/06* (2006.01)

(52) U.S. Cl.
  CPC .................. *F16B 2/22* (2013.01); *F16B 5/0692* (2013.01)

(58) Field of Classification Search
  CPC .......... B44C 7/02; A47H 15/00; E04B 9/303; E04B 2009/0492; E04B 2002/7479; E04B 9/06; E04B 9/18; E06B 9/52
  USPC ................. 52/222, 63, 23, 83, 461, 273, 202; 160/380, 399, 402, 392, 395; 135/87, 135/119 X, 120.1, 156
  See application file for complete search history.

(56) References Cited

U.S. PATENT DOCUMENTS

| | | | | |
|---|---|---|---|---|
| 4,103,401 A | * | 8/1978 | Conley | 24/462 |
| 4,189,880 A | * | 2/1980 | Ballin | 52/202 |
| 4,502,256 A | * | 3/1985 | Hahn | 52/63 |
| 4,534,145 A | * | 8/1985 | Yang et al. | 52/222 |
| 4,566,236 A | * | 1/1986 | Pound | 52/222 |
| 4,617,771 A | * | 10/1986 | Tomaszewski | 52/410 |
| 4,665,670 A | * | 5/1987 | van den Burg | 52/222 |
| 4,744,187 A | * | 5/1988 | Tripp | 52/410 |
| 4,759,518 A | * | 7/1988 | Yardas | 248/97 |
| 4,769,877 A | * | 9/1988 | Conley | 24/462 |
| 4,817,699 A | * | 4/1989 | Fein | 160/327 |
| 4,949,523 A | * | 8/1990 | Kassem | 52/713 |
| 4,986,332 A | * | 1/1991 | Lanuza | 160/327 |
| 5,044,131 A | * | 9/1991 | Fisher | 52/63 |
| 5,343,824 A | * | 9/1994 | Floyd | 114/361 |
| 5,581,966 A | * | 12/1996 | Fligg | 52/404.3 |
| 5,906,078 A | * | 5/1999 | Cramer | 52/222 |
| 6,431,251 B1 | * | 8/2002 | Yerusalim et al. | 160/327 |
| 6,789,978 B1 | * | 9/2004 | Yoshinari | 403/381 |
| 7,797,906 B2 | * | 9/2010 | Kassem | 52/713 |
| 8,056,602 B1 | * | 11/2011 | Green | 160/392 |
| 8,074,411 B1 | * | 12/2011 | Anderson et al. | 52/222 |

* cited by examiner

*Primary Examiner* — Beth Stephan (57) ABSTRACT

The fastening device 10 of FIG. 3 is provided for fastening a flexible material to a structure. The fastening device 10 comprises an elongate fastening member 12 having a male portion 11 and a base portion 13. The base portion 13 provides a plurality of indentations 14 at spaced apart intervals along the length of the fastening member 12. The indentations 16 are adapted for securing the fastening member 12 to the structure with the use of fasteners extending through the indentations 16. The male portion 11 is shaped for receiving an elongate clip-type retaining member 24. The male portion 11 provides a channel 15 on its surface facing away from the base portion 13 for cooperating with a projection 17 on an inner surface of the clip-type retaining member 24. The channel 15 is positioned for alignment with the projection 17 for receiving the flexible material as the projection 17 forces the flexible material into the channel 15. The fastening system allows for easy replacement of damaged or worn shade cloth, and allows for re-use of the existing fastening system for positioning of new shade cloth.

21 Claims, 11 Drawing Sheets

FASTENING SYSTEMS AND METHODS FOR FIXING FLEXIBLE MATERIAL

FIELD OF THE INVENTION

The present invention relates to fastening systems and fastening methods. The present invention relates particularly but not exclusively for use in securing flexible web material, such as a mesh-like fabric or shade cloth, to an outdoor structure.

BACKGROUND TO THE INVENTION

Shade cloth and other similar mesh-like fabrics or flexible web materials are widely used in various industrial and household applications. Shade cloth and plastic sheeting is used on a large scale in agricultural applications such as in tunnel houses to protect crops from the sun, adverse weather conditions, and from pests. Shade cloth is also used extensively in homes, for example as an inexpensive cover to provide shade for verandas and pergolas.

In all of these applications, there are problems in prior art fastening systems with satisfactorily securing the shade cloth to the respective structure, and also to retain the shade cloth in a tensioned condition to prevent sagging of the material.

In industrial applications, there is a need for a system that can secure very long lengths of material, for example in the case of tunnel houses which may be a few hundred meters in length. Furthermore, there is a need for these systems to be robust so that in industrial applications the secured shade cloth is strong enough to withstand a force applied to the shade cloth.

It is against this background and the problems and difficulties associated therewith that the present invention has been developed.

It is to be recognised that any discussion in the present specification is intended to explain the context of the present invention. It is not to be taken as an admission that the material discussed formed part of the prior art base or relevant general knowledge in any particular country or region.

SUMMARY OF THE INVENTION

According to a first aspect of preferred embodiments herein described there is provided a fastening device for fastening flexible material to a structure; the fastening device comprising an elongate fastening member having a male portion and a base portion; the base portion providing a plurality of indentations at spaced apart intervals along the length of the fastening member; the indentations being adapted for securing the fastening member to the structure with the use of fasteners extending through the indentations; the male portion being shaped for receiving an elongate clip-type retaining member; the male portion providing a channel on its surface facing away from the base portion for cooperating with a projection on an inner surface of the clip-type retaining member; the channel positioned for alignment with the projection of the clip-type retaining member for receiving the flexible material as the projection of the clip-type retaining member forces the flexible material into the channel.

Preferably the channel is an elongate channel extending substantially along the surface of the male portion to provide an elongate extending channel for engaging a substantial length of the flexible web material.

Preferably the channel is 1 to 3 mm wide.

Preferably the channel is 1 to 3 mm deep.

Preferably the channel is centrally positioned relative to the cross-section of the fastening member.

Preferably the channel is positioned on the end of the male portion furthest away from the base portion.

Preferably the channel is of rectangular shape. Other shaped such as a triangular shape are possible.

Preferably the channel follows the shape of the projection on the inner surface of the clip-type retaining member.

Preferably each indentation comprises at least one aperture through which a securing means such as a screw, bolt, or nail may be positioned for securing the fastening member to the structure.

The flexible material is preferably a netting material, plastic sheeting, mesh or a mesh-like fabric. The mesh-like fabric is typically shade cloth or like material used to provide at least partial protection from the sun and weather conditions. The flexible material is typically fitted to a structure such as a support post or beam of a shade house, agricultural tunnel house, pergola or scaffolding.

The elongate cylindrical fastening member is preferably a tubular member made of suitable material such as plastics.

Preferably the fastening device includes the clip-type retaining member adapted for positioning over the fastening member to retain the flexible material in engagement with the fastening member.

Preferably the clip-type retaining member is adapted to snap-fit over the fastening member for ease of installation with the projection of the clip-type retaining member forcing the flexible material into the channel of the male portion.

Preferably the clip-type retaining member is an elongate tubular member having an opening along its length. The clip-type retaining member is preferably of generally C-shaped cross-section. The internal diameter of the clip-type retaining member preferably generally corresponds to the external diameter of the tubular fastening member. The clip-type retaining member is preferably further provided with a pair of opposing flanges which protrude either side of the opening. The flanges assist in ensuring that the flexible material is held securely against the fastening member.

According to another aspect of the present invention there is provided a fastening system for fastening flexible web material to a structure, the fastening system comprising:
- an elongate fastening member having a male portion in the form of a substantially cylindrical portion and having a base portion for attaching the fastening member to the structure so that in use the flexible web material can be fastened to the male portion; and
- a clip-type retaining member adapted for positioning over male portion of the fastening member with the flexible web material therebetween to fasten the web material;
- wherein the male portion is shaped for receiving the elongate clip-type retaining member; the male portion provides a channel on its surface facing away from the base portion for cooperating with a projection on the inner surface of the clip-type retaining member; the channel positioned for alignment with the projection of the clip-type retaining member for receiving the flexible material as the projection of the clip-type retaining member forces the flexible material into the channel.

Preferably the channel is an elongate channel extending substantially along the surface of the male portion to provide an elongate extending channel for engaging a substantial length of the flexible web material.

Preferably the channel is between 1 to 3 mm wide.

Preferably the channel is between 1 to 3 mm deep.

Preferably the channel is positioned on the end of the male portion furthest away from the base portion.

Preferably the channel is of rectangular shape.

Preferably the means for attaching the fastening member to the structure is in the form of a plurality of indentations provided at spaced apart intervals along the length of the fastening member. Preferably each indentation comprises at least one aperture through which a securing means such as a screw, bolt, rivet, or nail may be positioned for securing the fastening member to the structure.

Preferably the fastening member is one of a plurality of fastening members joined end to end. Preferably each fastening member is joined to an adjacent fastening member by means of a tongue and groove joint.

Typically the substantially cylindrical portion of the fastening member is of generally circular cross-section. The substantially cylindrical portion may also be formed with a modified cross-section, for example, with one or more planar surfaces extending along the full length of the fastening member.

Preferably the clip-type retaining member is an elongate clip-type retaining member that extends substantially the full length of the fastening member. In a preferred form, the clip-type retaining member is adapted to snap-fit over the fastening member for ease of installation.

Preferably the clip-type retaining member is an elongate sleeve member having an elongate opening along its length. The clip-type retaining member is more preferably of generally C-shaped cross-section. The internal diameter of the clip-type retaining member preferably generally corresponds to the external diameter of the substantially cylindrical fastening member. The clip-type retaining member is preferably further provided with a pair of opposing flanges which protrude on either side of the opening. The flanges assist in ensuring that the flexible web material is held securely against the fastening member and also assist in ease of removal of the clip-type retaining member from the fastening member.

The flexible web material is typically a netting, plastic sheet, mesh or a mesh-like fabric. The mesh-like fabric is typically shade cloth or similar material used to provide at least partial protection from the sun and weather conditions. The flexible material is typically fitted to a structure such as a support post or beam of a shade house, agricultural tunnel house, pergola or scaffolding.

Preferably the system further comprises a securing means for securing the fastening member to the structure. The securing means preferably comprises one or more screws, nails, rivet, or bolts. The structure is typically a support post or beam of a shade house, agricultural tunnel house, pergola or scaffolding.

Preferably the fastening member comprises an elongate fastening member having a substantially cylindrical portion and having means for attaching the fastening member to the structure so that in use the flexible web material can be fastened to the substantially cylindrical portion of the fastening member.

Preferably the substantially cylindrical portion of the fastening member is supported spaced apart from a surface of the structure to facilitate securing of the flexible web material to the fastening member.

According to a still further aspect of the present invention there is provided a fender system for protecting a surface of a structure, the fender system comprising:

an elongate fastening member having a substantially cylindrical portion and having means for securing the fastening member to the structure; and, a fender member adapted for positioning over the substantially cylindrical portion of the fastening member so as to provide protection from objects that bump against the structure.

Preferably the fender member is made from a resilient cushioning material so as to provide a cushioning effect when objects bump against the structure.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of the fastening device and fastening system of the invention, given by way of example only, with reference to the accompanying drawings, in which:

FIG. 1 shows a top perspective view of a fastening member of a first embodiment of a fastening device according to the present invention;

FIG. 2a is a perspective view of a clip-type retaining member of the first embodiment of the fastening device according to the invention;

FIG. 2b is a cross-sectional view of the clip-type retaining member of FIG. 2a;

FIG. 13a shows in plan view a boat fitted with an embodiment of a fender system according to the present invention; and, FIG. 13b is a top perspective view of the boat of FIG. 13a with an enlarged cross-section view of the fender system of FIG. 13a.

DETAILED DESCRIPTION OF PREFERRED EMBODIMENTS

Figures 1, 2A, 2B:
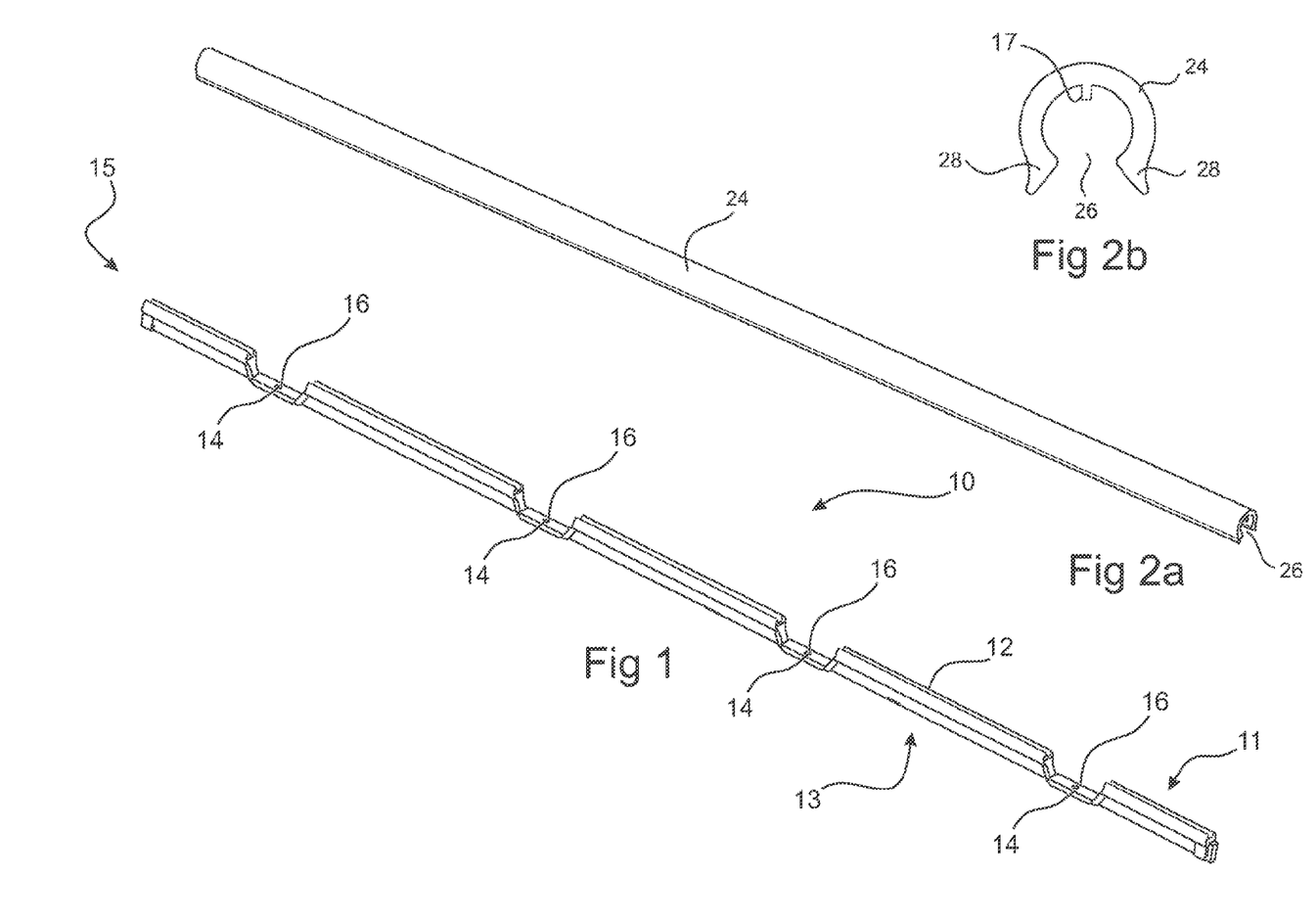

Referring to FIG. 1 there is shown a fastening device 10 according to a first preferred embodiment of the present invention.

The fastening device 10 is provided for fastening a flexible material to a structure. The fastening device 10 comprises an elongate fastening member 12 having a male portion 11 and a base portion 13. The base portion 13 provides a plurality of indentations 14 at spaced apart intervals along the length of the fastening member 12. The indentations 14 are adapted for securing the fastening member 12 to the structure with the use of fasteners 18 extending through the indentations 14. The male portion 11 is shaped for receiving an elongate clip-type retaining member 24. The male portion 11 provides a channel 15 on its surface facing away from the base portion 13 for cooperating with a projection 17 on an inner surface of the clip-type retaining member 24. The channel 15 is positioned for alignment with the projection 17 for receiving the flexible material as the projection 17 forces the flexible material into the channel 15. This is considered to advantageously assist with holding the flexible material in position.

Notably the indentations 14 are provided with apertures 16 through which screws 18 are positioned to secure the fastening member 12 to part of a structure in the form of a post 20.

The fastening member 12 is formed of a plastics material and is relatively light for ease of handling. The fastening member 12 may be of any suitable length depending on the application but lengths are usually standard sizes of 1200 mm, 2400 mm and 3600 mm lengths for ease of transport. The fastening member 12 is typically 8 mm in diameter but this diameter may be varied as required. The indentations 14 are spaced about 250 mm apart in the embodiment but this spacing may be varied as required.

Figure 3:
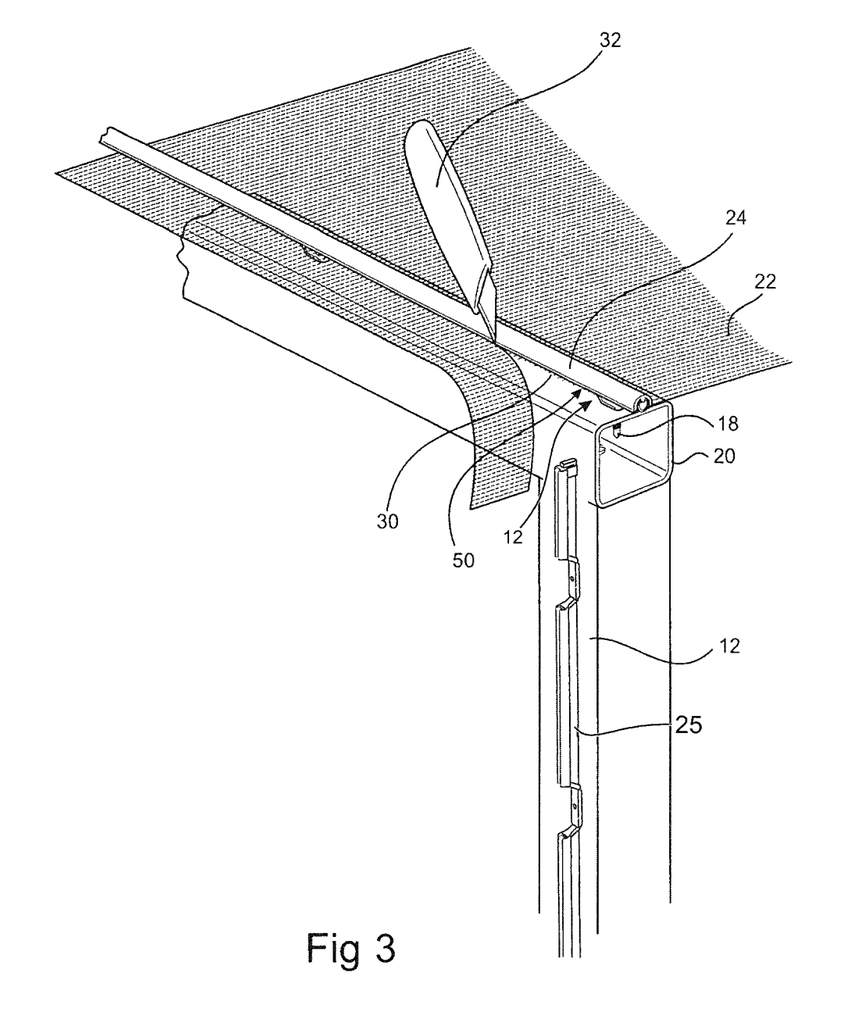
FIG. 3 is a perspective view of the fastening member of FIG. 1 positioned on a with excess shade cloth being trimmed.

Flexible material in the form of shade cloth 22 is placed over the fastening member 12 as shown in FIG. 3. The shade cloth 22 is placed over the fastening member 12 and is secured using the clip-type retaining member 24. Securing of the shade cloth 22 to the fastening member 12 is possible due to the space (provided by extension 25) which exists between the cylindrical male portion 11 and the post 20, as would be apparent from FIG. 5.

Figure 4:
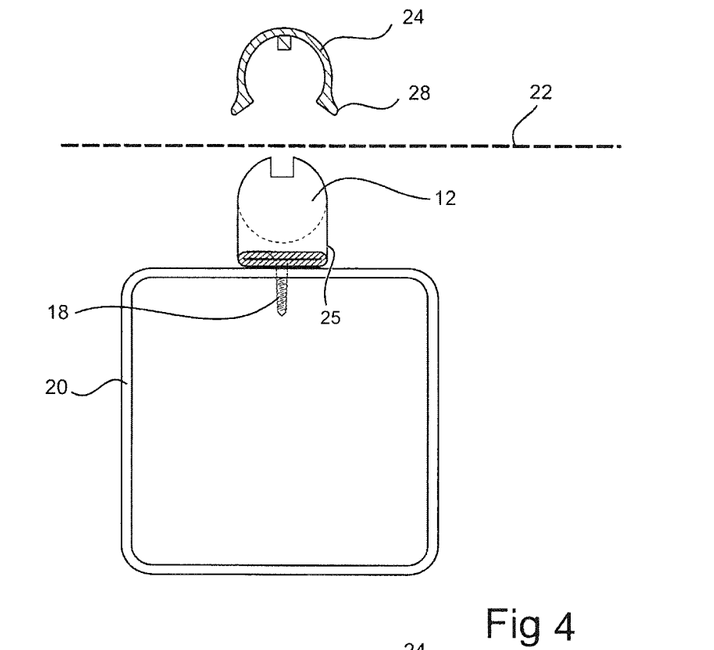
FIG. 4 is an end view of the fastening system of FIG. 3.
Figure 5:
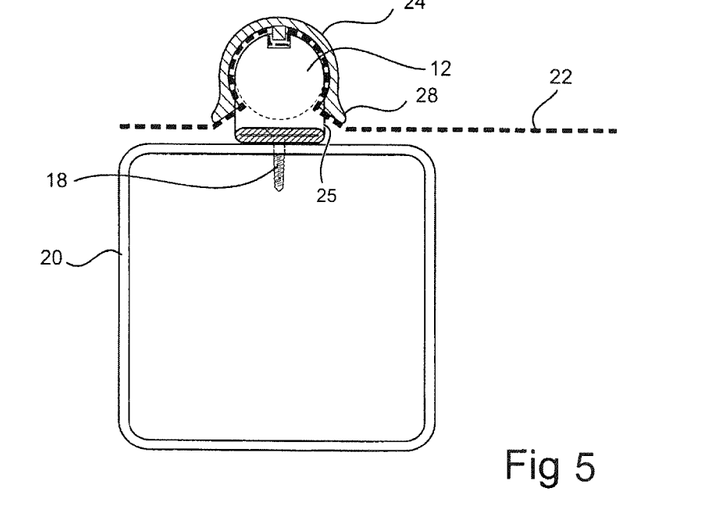
FIG. 5 is an end view of the fastening system of FIG. 4.

The shade cloth 22 is secured to the fastening member 12 by means of a clip-type retaining member 24 which is adapted for positioning over the fastening member 12 as shown in FIG. 3. The clip-type retaining member 24 is of generally C-shaped configuration with an opening 26 along the length of the fastening member to retain the shade cloth 22 in a securely held position between the fastening member 12 and the clip-type retaining member 24 as best seen in FIGS. 4 and 5. The internal diameter of the clip-type retaining member 24 generally corresponds to the external diameter of the tubular fastening member 12 as can be seen in FIGS. 4 and 5. The provision of the opening 26 in the clip-type retaining member 24 allows for some "give" so that the clip-type retaining member can be snap-fitted onto the fastening member.

Advantageously the channel 15 is an elongate channel that extends along the majority of the upper surface of the male portion 11 to provide an elongate extending channel 15 for engaging a substantial length of the shade cloth 22. In the embodiment the channel 15 extends over the majority of the full length of the fastening member 12 excluding the indentations 14. The channel 15 is about 3 mm wide and 3 mm deep. The channel follows the shape of the projection 17 on the inner surface of the clip-type retaining member 24. The channel 15 is positioned on the end of the male portion 11 furthest away from the base portion. The channel 15 is rectangularly shaped. The channel 15 cooperates with the projection 17 to firmly grip the cloth 22.

The clip-type retaining member 24 is made of a suitable plastics material such as polyethylene or other material with some flexibility to allow for ease of positioning over the fastening member. The clip-type retaining member 24 may be of variable length and may be positioned over a fastening member 12 of comparable length, or may be positioned over more than one fastening member as required. Alternatively, more than one clip-type retaining member may be positioned over a single fastening member. The clip-type retaining member 24 of the embodiment has a pair of opposing flanges 28 extending away from the opening 26 which assists in holding the shade cloth 22 in a secure arrangement with the fastening member 12. In an alternative embodiment (not shown), the flanges 28 may extend a further distance so as to hold the shade cloth 22 against the post 20.

The fastening member 12 and the clip-type retaining member provide a fastening system 50 according to another embodiment of the invention. In the embodiment the fastening member 12 is held in position on part of a structure in the form of a post 20 by screws 18, and a clip-type retaining member 24 snap-fitted over the fastening member 12 to hold a portion of shade cloth 22 securely in position on the post 20.

In terms of the process of application, a fastening member 12 is fixed to a post 20 by means of screws 18 positioned in apertures 16 in the indentations 14 spaced at intervals along the length of the fastening member 12. A length of shade cloth 22 is placed over the fastening member 12 with a portion of the shade cloth extending beyond the fastening member 12. A clip-type retaining member 24 is placed over the fastening member 12 and the shade cloth is secured in place on the post 20 by snap-fitting the clip-type retaining member 24 onto the fastening member 12. If required, the excess of the shade cloth 22 may be cut along the outside edge of the clip-type retaining member using a sharp knife 32. In this way a neat edge is formed which is visually attractive and also has the benefit of minimising the risk of a rough edge of shade cloth being accidentally pulled which may disrupt the securing of the shade cloth 22. The channel 15 and the projection 17 assist with holding the shade cloth 22 in position.

In the event that the shade cloth 22 needs to be re-aligned, tightened or replaced, the clip-type retaining member 24 can be simply pulled or eased off its position on the fastening member 12 to make the necessary adjustments. A difficulty with prior art systems, for example those using nails, is that it has been difficult to re-tension or replace a section of the shade cloth without damaging the fastening system, or the shade cloth, since the nails have to be pulled out.

Due to the secure snap-fit which is formed between the fastening member and the clip-type retaining member, the shade cloth is strongly held between these two members. This allows the pergola or shade cover to be robust and to be able to withstand force such as the weight of a person walking on the shade cloth, or adverse weather conditions such as strong wind. However, the ease with which the clip-type retaining member may be removed from the fastening member and reattached, enables the shade cloth to be readily re-tensioned as required if, for example, the shade cloth is disrupted so that is sags in extreme weather conditions.

Figure 6:
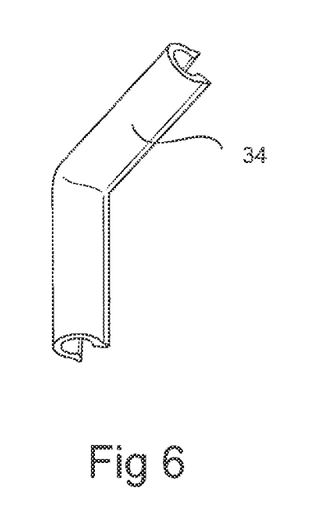
FIG. 6 is a perspective view of a corner clip-type retaining member of the first embodiment of the fastening system of the invention.
Figure 7:
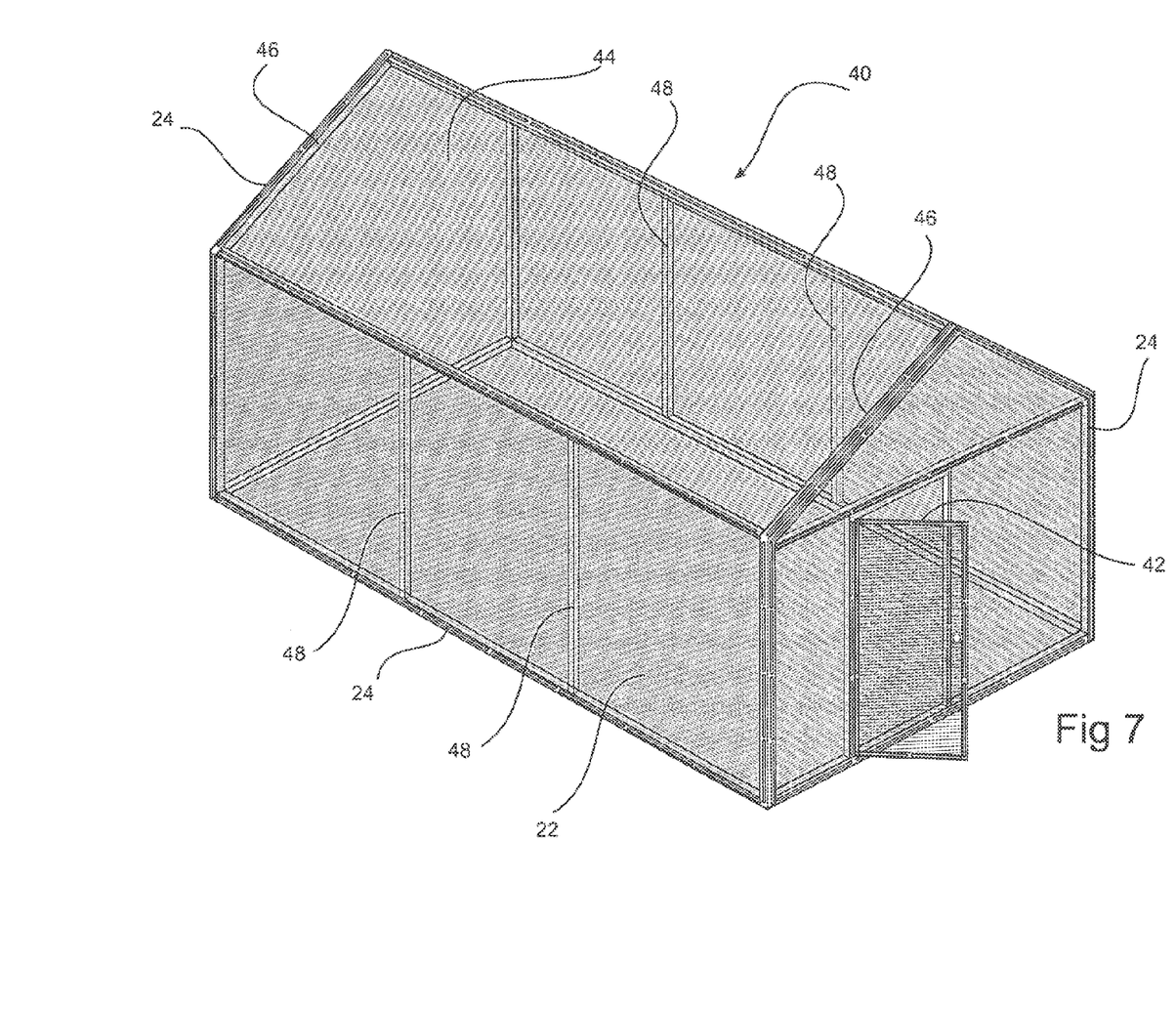
FIG. 7 is a perspective view of an agricultural greenhouse covered in shade cloth secured by a fastening system of the invention.

FIG. 6 shows an elbow-shaped clip-type retaining member 34 that is used to position over abutting angled fastening members 12 such as at a corner of a greenhouse 40 shown in FIG. 7.

The greenhouse 40 has a gate 42 and roof 44 with beams 46 and supporting posts 48. The greenhouse 40 is covered in shade cloth 22 secured by the fastening system of the embodiment. The retaining members 24 can be seen in this Figure in horizontal and vertical arrangement around the various parts of the structure of the greenhouse 40. The shade cloth may be stretched across long lengths of the sides of the greenhouse 40 and secured at each end by means of the fastening system. Likewise the shade cloth 22 may be secured at each end on the beams 46 over the length of the roof 44. The fastening system is also suitable for shorter lengths such as to retain shade cloth on the gate 42 of the greenhouse 40.

Other modifications may be made to the fastening device and fastening system, in particular to accommodate variations in design of the structure to which the shade cloth is to be secured.

A second embodiment of the fastening system 60 for fastening a flexible web material, such as shade cloth, to a structure will now be described with reference to FIGS. 8 to 12 of the accompanying drawings. The fastening system 60 includes an elongate fastening member 62 having a substantially cylindrical portion 64.

Figure 8:
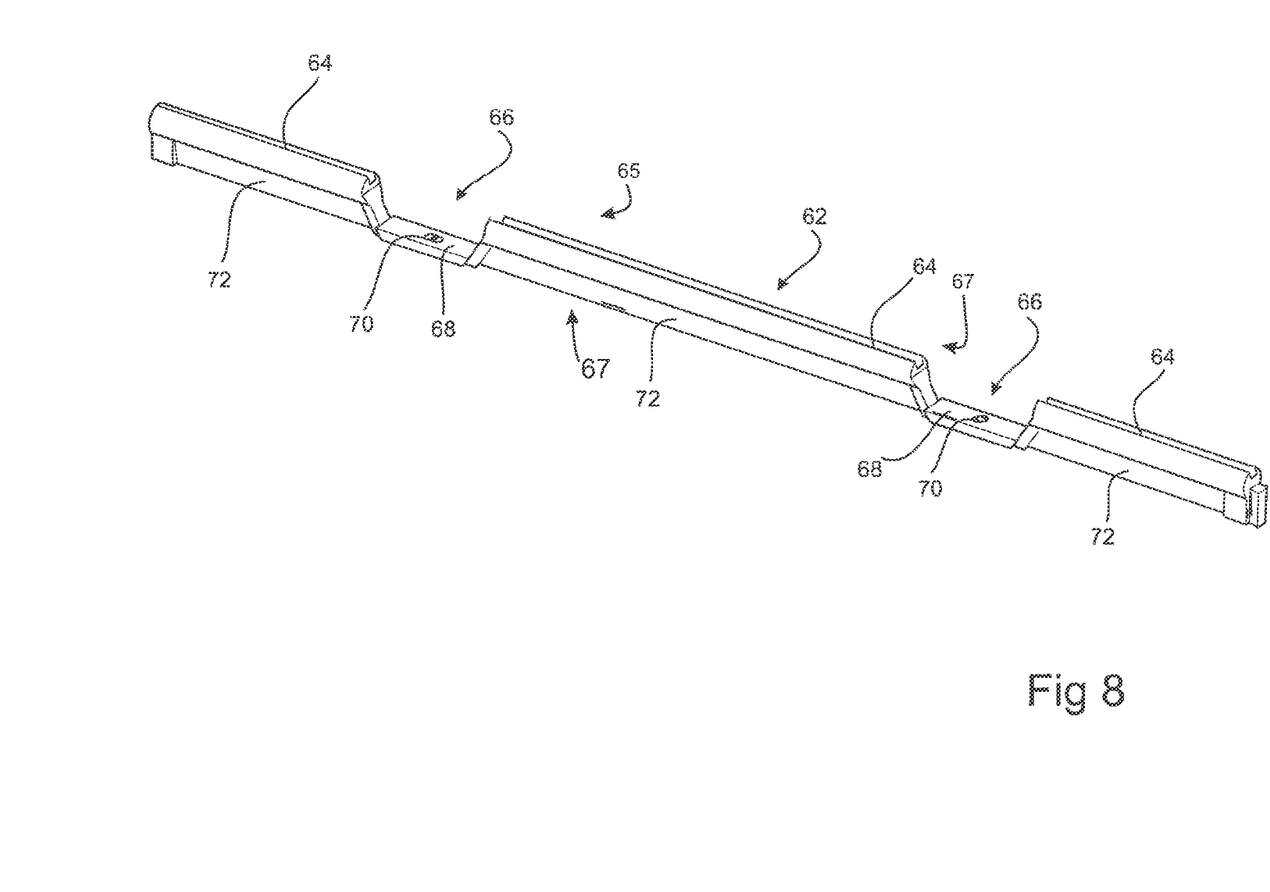
FIG. 8 is a top perspective view of a fastening member employed in a second embodiment of a fastening system according to the present invention.
Figure 9:
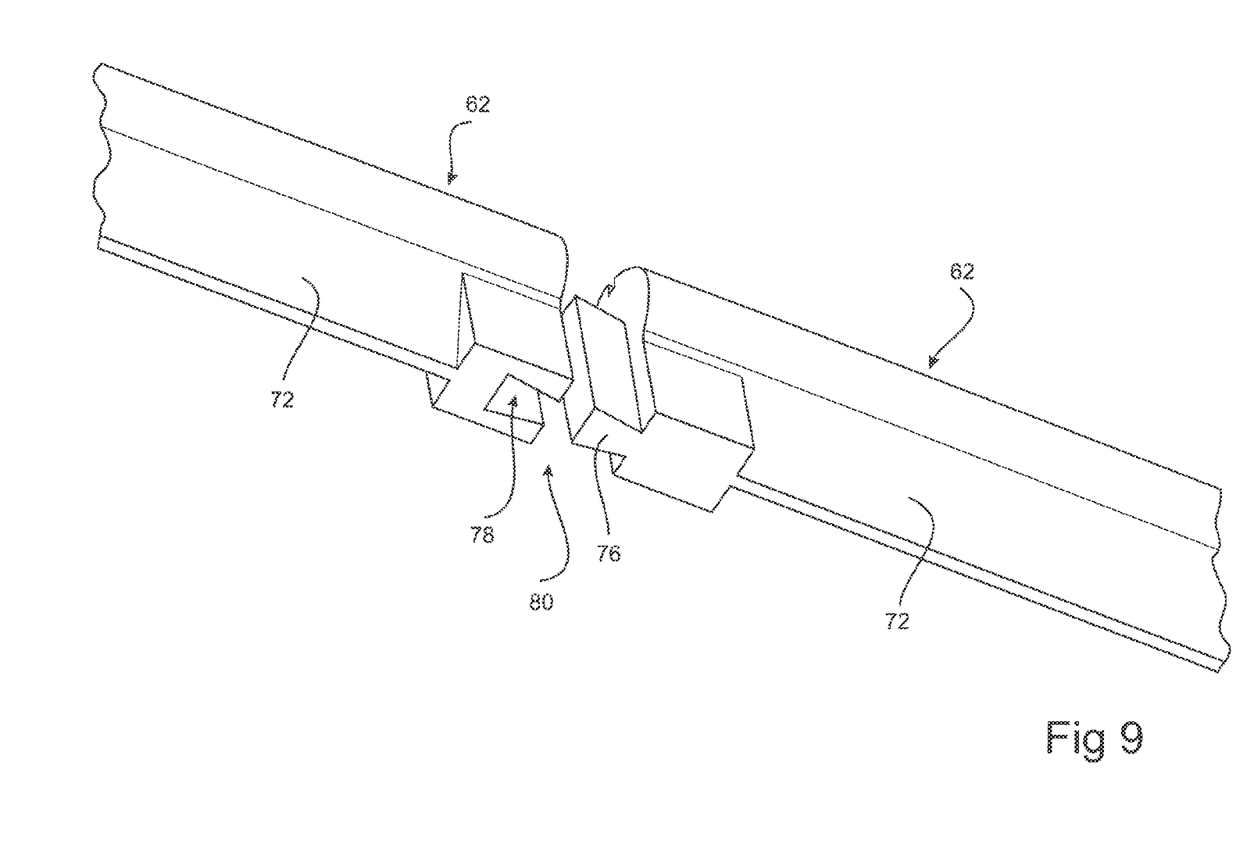
FIG. 9 is a bottom perspective view of two fastening members employed in the fastening system of FIG. 8, showing how the fastening members are joined end to end.
Figure 10:
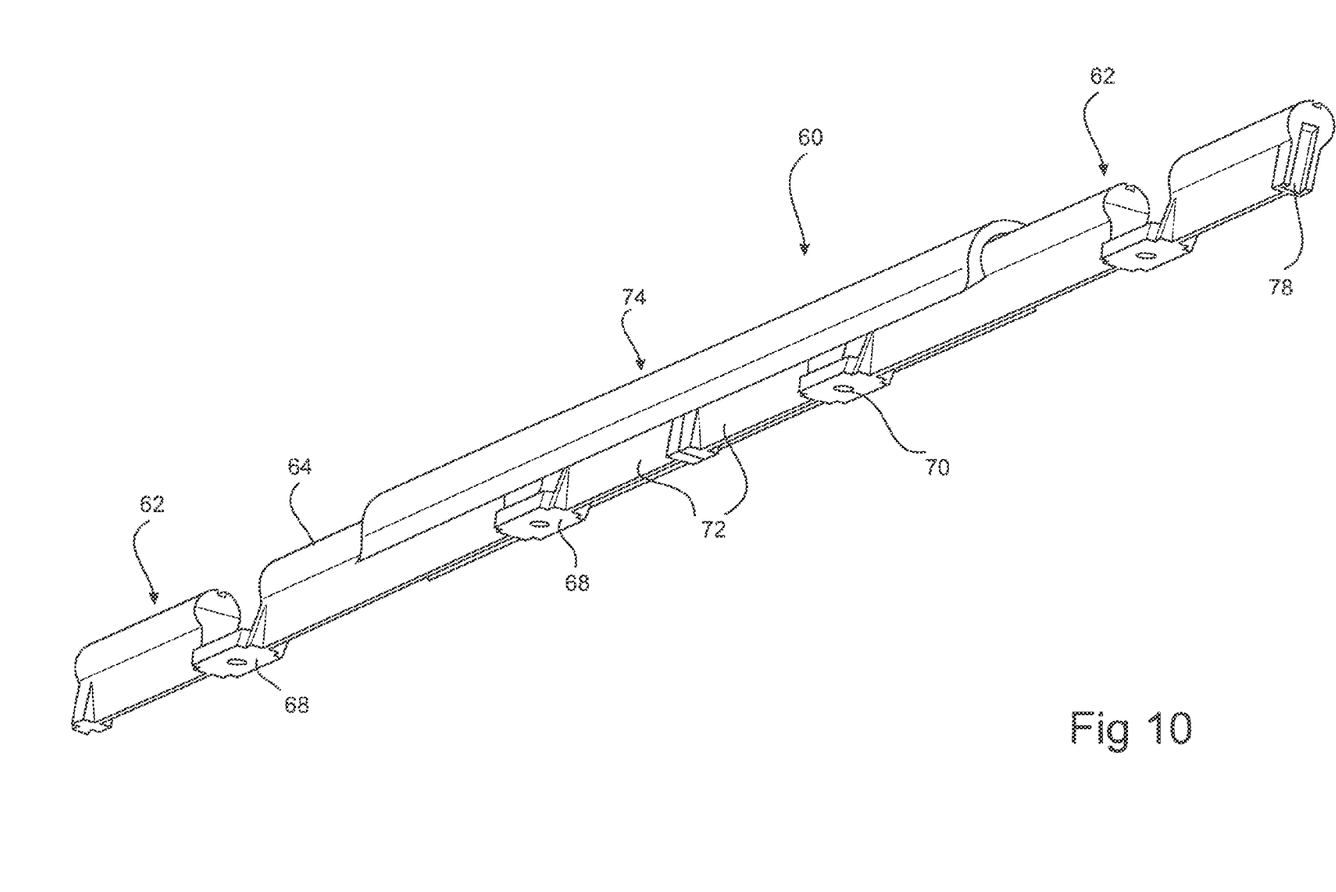
FIG. 10 is a bottom perspective view of the second embodiment of the fastening system according to the present invention.
Figure 11:
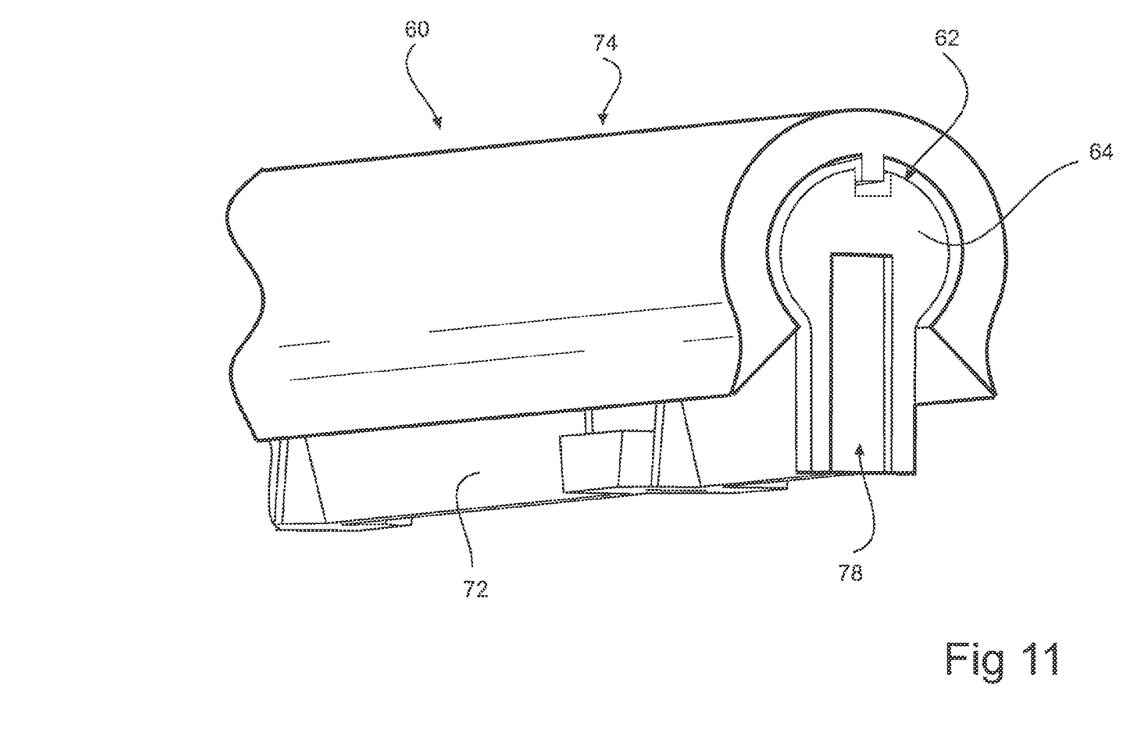
FIG. 11 is an end perspective view of the fastening system of FIG. 10.

Again there is provided a male portion 65 extending away from a base portion 67. The male portion 65 is shaped for receiving the elongate clip-type retaining member. The male portion 65 provides a channel 67 on its surface facing away from the base portion for cooperation with a projection on the inner surface of the clip-type retaining member.

The channel is positioned centrally for alignment with the projection on the inner surface of the clip-type retaining member for receiving flexible material as the projection on the inner surface of the clip-type retaining member forces the flexible material into the channel.

The fastening member 62 also provides means 66 for attaching the fastening member 62 to the structure (not shown), so that in use the flexible web material can be fastened to the substantially cylindrical portion 64 of the fastening member 62. In this embodiment the fastening member 62 is manufactured from a suitably strong and UV-resistant moulded plastics material, for example, a polyurethane plastics material.

The means 66 for attaching the fastening member 62 to the structure is provided in the form of a plurality of indentations 66 provided at spaced apart intervals along the length of the fastening member. Preferably each indentation 66 comprises planar portion 68 with at least one aperture 70 provided therein through which a securing means such as a screw, bolt, rivet, or nail may be positioned for securing the fastening member 62 to the structure.

The substantially cylindrical portion 64 of the fastening member 62 is mounted spaced apart from the surface of the structure to facilitate securing of the flexible web material to the fastening member. The space between the substantially cylindrical portion 64 and the surface of the structure is filled with a skirt 72, as can be seen most clearly in FIGS. 8, 9 and 10. The provision of skirt 72 ensures a substantially airtight seal is formed between the fastening member 62 and the surface of the structure, when the fastening member is secured to the structure. This may be important where the flexible web material is an airtight material, such as transparent or translucent plastic sheeting for a hothouse, so as to retain the hot air within the hothouse.

Preferably the fastening member 62 is one of a plurality of fastening members joined end to end. Typically each fastening member 62 is approximately 300 mm in length; however the length may be varied depending on the application. Preferably each fastening member 62 is joined to an adjacent fastening member by means of a tongue and groove joint 80, as can be seen most clearly in FIG. 9. At one end of each fastening member 62 there is provided a tongue 76, and at the other end a matching groove 78 within which the tongue 76 is received in a friction fit. The tongue and groove joint 80 ensures that all of the fastening members 62 are aligned end to end to form effectively one continuous elongate fastening member.

The fastening system 60 further comprises a clip-type retaining member 74 adapted for positioning over the substantially cylindrical portion 64 of the fastening member 62, with the flexible web material there between, wherein the flexible web material is securely retained on the fastening member 62. The clip-type retaining member 74 is in the form of an elongate sleeve having a longitudinal opening along its length. The clip-type retaining member 74 may be one of a plurality of retaining members, for example, like that illustrated in FIG. 10, secured to the fastening member 62 at spaced intervals. More typically, the clip-type retaining member 74 extends substantially the full length of the fastening member 62.

Typically the substantially cylindrical portion 64 of the fastening member 62 is of generally circular cross-section with an outside diameter of approximately 8.0 mm. The internal diameter of the clip-type retaining member 74 is designed to match the external diameter of the substantially cylindrical portion 64, as can be seen most clearly in FIG. 11. The internal diameter of the clip-type retaining member 74 in the illustrated embodiment is approximately 8.7 mm. In this embodiment the substantially cylindrical portion 64 is moulded as a solid cylinder of plastics material. However the substantially cylindrical portion 64 may also be moulded with a modified cross-section, for example, with one or more planar surfaces extending along the full length of the fastening member 62. The internal cross-sectional profile of the clip-type retaining member 74 would then likewise be modified to match that of the substantially cylindrical portion 64.

Figure 12:
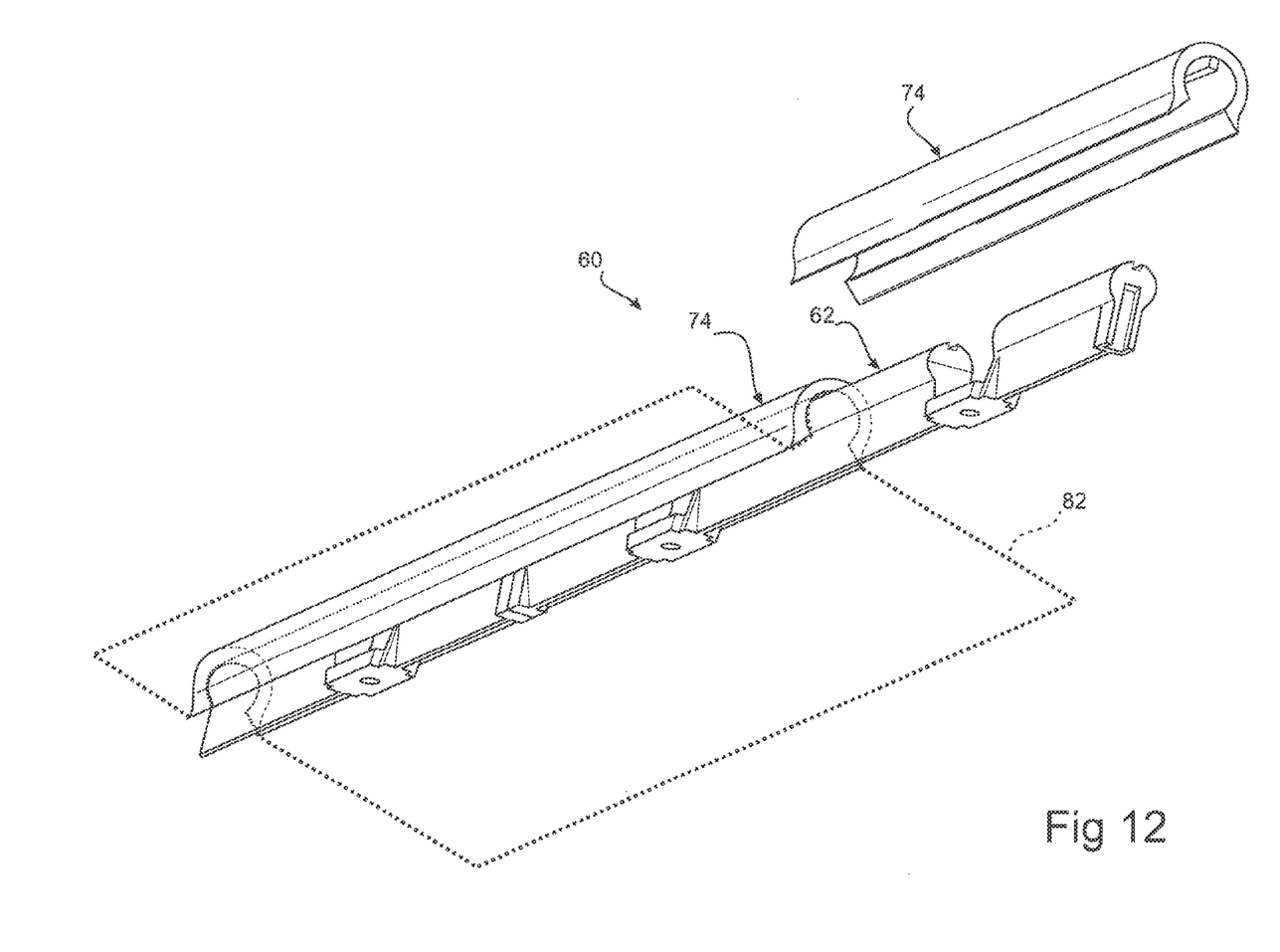
FIG. 12 shows a method of securing a flexible web material using the fastening system of FIG. 10.

The flexible web material is typically a netting material, plastic sheet, mesh or a mesh-like fabric. The mesh-like fabric is typically shade cloth or similar material used to provide at least partial protection from the sun and weather conditions. The flexible material is typically fitted to a structure such as a support post or beam of a shade house, hot house, green house, agricultural tunnel house, pergola or scaffolding. A securing means (not shown) for securing the fastening member 62 to the structure preferably comprises one or more screws, nails, rivet, or bolts which are driven into a post, beam or frame of the structure through apertures 70. FIG. 12 illustrates one step in the process of securing a web of flexible material 82, such as shade cloth, to a structure (not shown), using the fastening system 60. The fastening system can also be employed as a fender system for protecting a surface of a structure, for example, an edge of a boat.

Figure 13A:
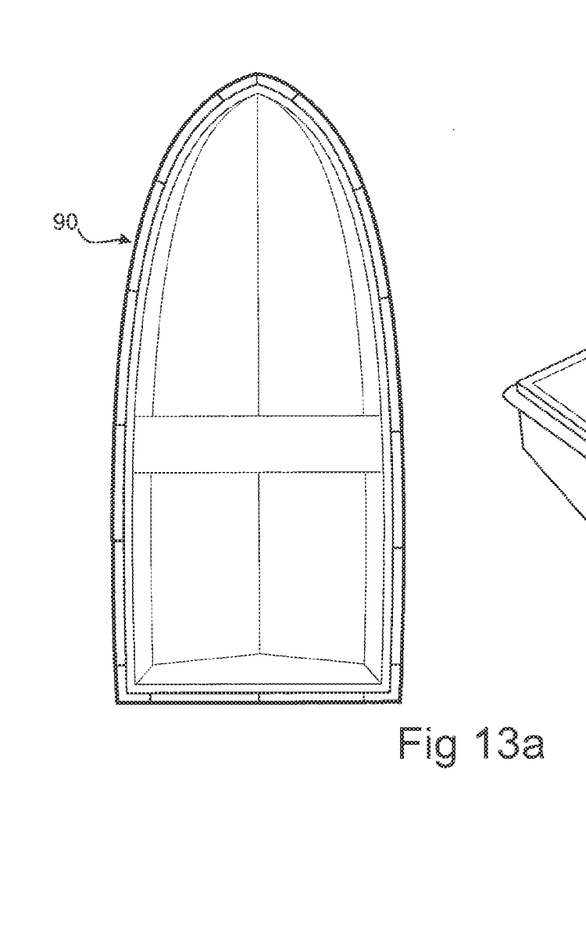
Figure 13B:
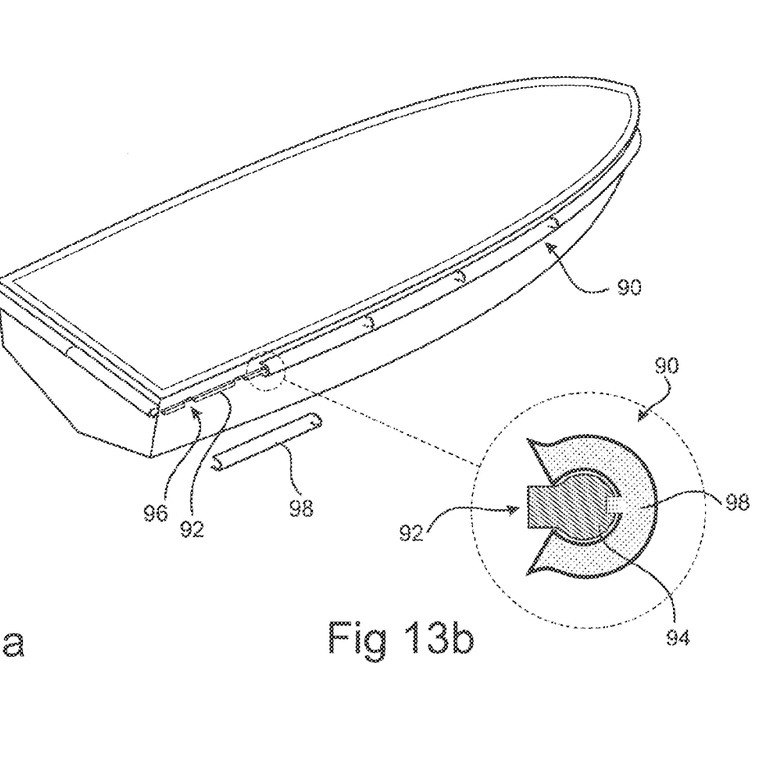

FIGS. 13*a* and 13*b* illustrate a possible embodiment of the fender system 90 according to an embodiment applied to a boat. The fender system 90 comprises an elongate fastening member 92 having a substantially cylindrical portion 94 and means 96 for securing the fastening member 92 to the edge of the boat. The fender system 90 further comprises a fender member 98 adapted for positioning over the substantially cylindrical portion 94 of the fastening member 92 so as to provide protection from objects that bump against the boat. The structure and function of the fender member 98 is similar to that of the clip-type retaining member 74 of the previous embodiment, except that the fender member 98 is not typically used to secure a web of flexible material to the structure. Like the clip-type retaining member 74, the fender member 98 has a C-shaped cross-section, as can be seen most clearly in the enlargement of FIG. 13*b*. The secure snap-fit between the fender member 98 and the fastening member 92 ensures that the fender member remains securely attached to the fastening member. However it also facilitates the quick and easy removal and replacement of a length of the fender member in the event it becomes damaged or worn. Preferably the fender member is made from a resilient cushioning material, such as rubber or firm foamed plastics material, so as to provide a cushioning effect when objects bump against the boat.

The fender system 90 can be used in many other applications where protection is required from or for objects that bump against a structure, for example, were shopping trolleys bump against a wall or in a garage to prevent the car doors from being damaged if they bump against the garage wall when opened.

Now that preferred embodiments of the fastening device and fastening system have been described in detail, it will be apparent that the embodiments provide a number of advantages over the prior art, including the following:

(i) The fastening device is easily and quickly fitted to a post or other structure reducing labour costs and providing a suitable means for use by a home handyman.

(ii) The fastening device and fastening system allow for easy replacement of damaged or worn shade cloth, and allow for re-use of the existing fastening device and system for positioning of new shade cloth.

(iii) The fastening device and system allow for fixing of shade cloth or other flexible web material without the need for complicated or specialised tools.

(iv) Shade cloth or other web material may be securely fixed using the fastening device to form a robust structure so as to withstand force such as wind or the weight of a person.

(v) The tensioning of the shade cloth may be easily adjusted as required during installation, or at any time after installation, by simply lifting and refitting the retaining member.

(vi) The shade cloth is held firmly in position, being pushed in the channel provided by the fastening member.

It will be readily apparent to persons skilled in the relevant arts that various modifications and improvements may be made to the foregoing embodiments, in addition to those already described, without departing from the basic inventive concepts of the present invention.

For example, the fastening member may be secured to a support at the indentations using an industrial glue instead of nails or screws such that apertures are not required in the indentations.

It will be appreciated that the scope of the invention is not limited to the specific embodiments described and is to be determined from the appended claims. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope. Various alterations and equivalent forms may be provided without departing from the spirit and scope of the present invention.

In the present specification, the presence of particular features does not preclude the existence of further features. The words 'comprising', 'including' and 'having' are to be construed in an inclusive rather than an exclusive sense.

The invention claimed is:

1. A fastening device for fastening flexible material to a structure, the fastening device comprising an elongate fastening member having a male portion and a base portion, the base portion providing a plurality of indentations at spaced apart intervals along the fastening member, the indentations being adapted for securing the fastening member to the structure with the use of fasteners extending through the indentations; the male portion being shaped as an elongate substantially cylindrical member for receiving an elongate clip retaining member forming part of the fastening device; the elongate clip retaining member comprising a hollow tubular member having an opening along the hollow tubular member for receiving the male portion; the male portion providing a channel on a surface of the male portion facing away from the base portion for cooperating with a projection on an inner surface of the elongate clip retaining member; the channel positioned for alignment with the projection of the elongate clip retaining member for receiving the flexible material as the projection of the elongate clip retaining member forces the flexible material into the channel.

2. The fastening device as claimed in claim 1 wherein the channel provides an elongate extending channel for engaging the flexible web material.

3. The fastening device as claimed in claim 1 wherein the channel is 1 to 3 mm wide.

4. The fastening device as claimed in claim 1 wherein the channel is 1 to 3 mm deep.

5. The fastening device as claimed in claim 1 wherein the channel is centrally positioned relative to a cross-section of the fastening member.

6. The fastening device as claimed in claim 1 wherein the channel is positioned on an end of the male portion furthest away from the base portion.

7. The fastening device as claimed in claim 1 wherein the channel is of rectangular shape.

8. The fastening device as claimed in claim 1 wherein the channel follows the shape of the projection on an inner surface of the elongate clip retaining member.

9. The fastening device as claimed in claim 1, wherein the elongate clip retaining member is adapted to snap-fit over the fastening member for ease of installation.

10. The fastening device as claimed in claim 9, wherein the elongate clip retaining member is an elongate tubular member having an opening along its length.

11. The fastening device as claimed in claim 10, wherein the elongate clip retaining member is of a generally C shaped cross-section.

12. The fastening device as defined in claim 11, wherein an internal diameter of the elongate clip retaining member generally corresponds to an external diameter of the elongate cylindrical fastening member.

13. The fastening device as defined in claim 12, wherein the elongate clip retaining member is provided with a pair of opposing flanges which protrude either side of the opening.

14. The fastening device as defined in claim 13,
wherein the flanges assist in ensuring that the flexible material is held securely against the fastening member.

15. A fastening system for fastening a flexible web material to a structure, the fastening system comprising:
an elongate fastening member having a male portion in the form of a substantially cylindrical portion and having a base portion for attaching the fastening member to the structure so that in use the flexible web material can be fastened to the male portion; and
an elongate clip retaining member adapted for positioning over the male portion of the fastening member with the flexible web material therebetween to fasten the web material, the elongate clip retaining member comprising a hollow tubular member having an opening along the hollow tubular member for receiving the male portion;
wherein the male portion is shaped for receiving the elongate clip retaining member; the male portion provides a channel on a surface of the male portion facing away from the base portion for cooperating with a projection on an inner surface of the elongate clip retaining member; the channel positioned for alignment with the projection of the elongate clip retaining member for receiving the flexible material as the projection of the elongate clip retaining member forces the flexible material into the channel.

16. The fastening device as claimed in claim 15 wherein the channel provides an elongate extending channel for engaging the flexible web material.

17. The fastening device as claimed in claim 15 wherein the channel is 1 to 3 mm wide.

18. The fastening device as claimed in claim 15 wherein the channel is 1 to 3 mm deep.

19. The fastening as claimed in claim 15 wherein the channel is centrally positioned relative to a cross-section of the fastening member.

20. The fastening device as claimed in claim 15 wherein the channel is positioned on an end of the male portion furthest away from the base portion.

21. The fastening device as claimed in claim 15 wherein the channel follows the shape of the projection on an inner surface of the elongate clip retaining member.

* * * * *